(Model.)
J. FELDMIER.
CORN PLANTER.
No. 255,962. Patented Apr. 4, 1882.
2 Sheets—Sheet 1.
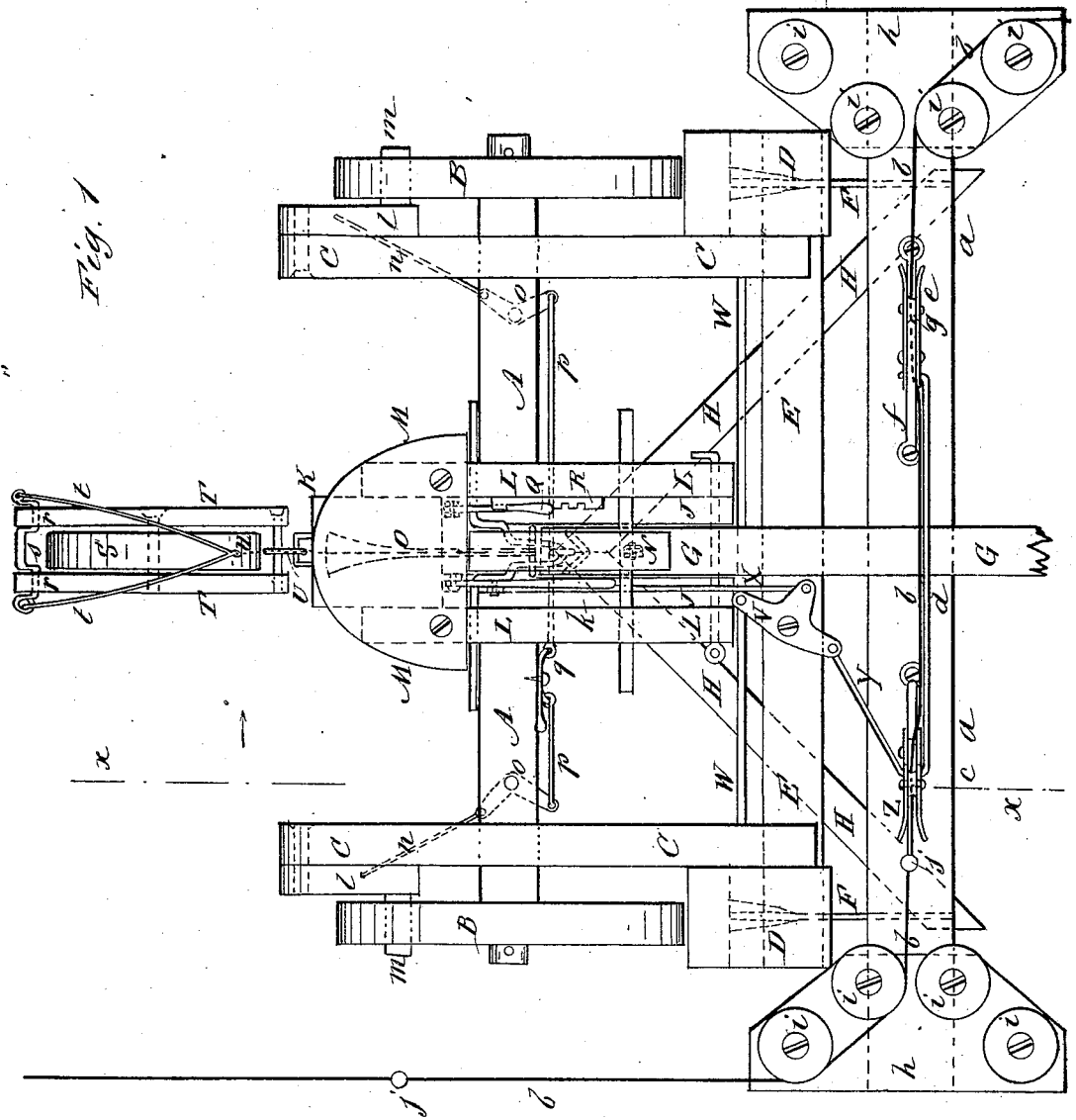
WITNESSES:
C. Neveux
C. Sedgwick
INVENTOR:
J. Feldmier
BY Munn & Co
ATTORNEYS.

(Model.)
2 Sheets—Sheet 2.
J. FELDMIER.
CORN PLANTER.
No. 255,962. Patented Apr. 4, 1882.
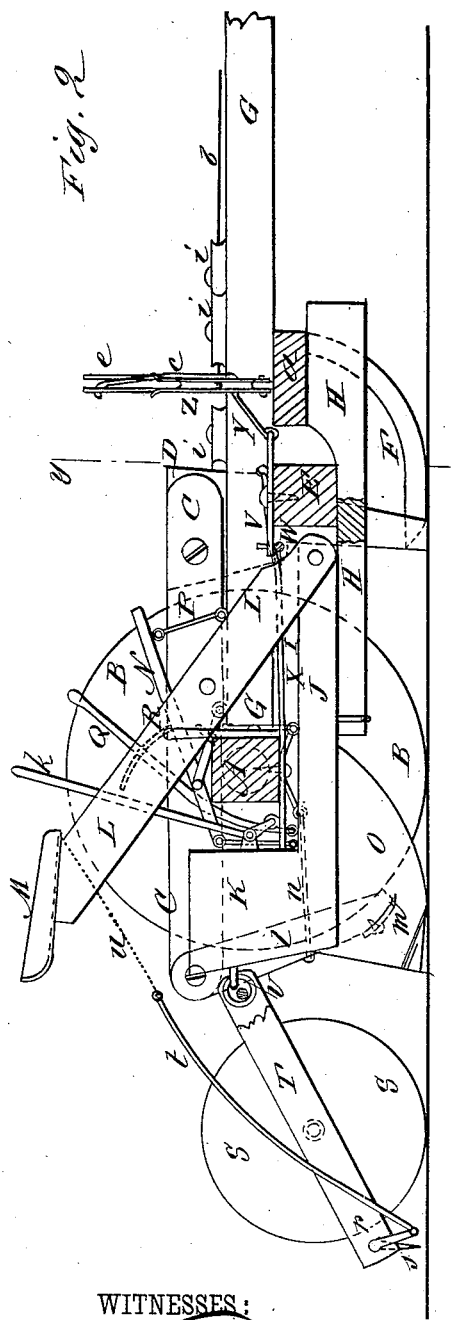
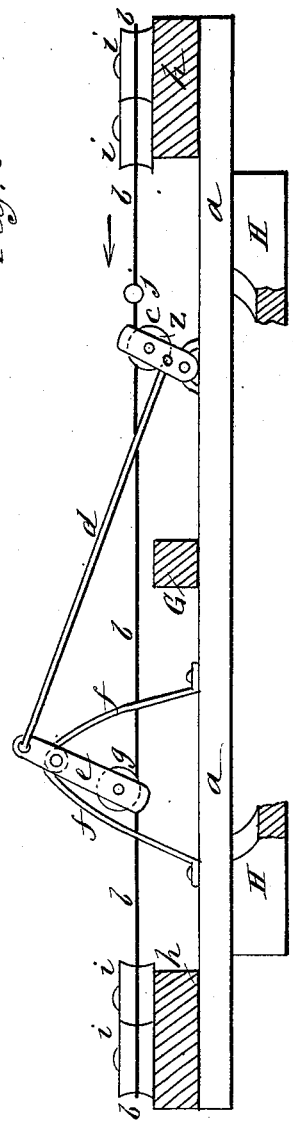
WITNESSES:
C. Neveux
C. Sedgwick
INVENTOR:
J. Feldmier
BY Munn & Co
ATTORNEYS.

UNITED STATES PATENT OFFICE.

JOHN FELDMIER, OF OSKALOOSA, KANSAS.

CORN-PLANTER.

SPECIFICATION forming part of Letters Patent No. 255,962, dated April 4, 1882.

Application filed September 10, 1881. (Model.)

*To all whom it may concern:*

Be it known that I, JOHN FELDMIER, of Oskaloosa, in the county of Jefferson and State of Kansas, have invented certain new and useful Improvements in Corn-Planters, of which the following is a specification.

Reference is to be had to the accompanying drawings, forming part of this specification, in which similar letters of reference indicate corresponding parts in all the figures.

Figure 1, Sheet 1, is a plan view of my improvement. Fig. 2, Sheet 2, is a sectional side elevation of the same, taken through the line $x\ x$, Fig. 1. Fig. 3, Sheet 2, is a sectional front elevation of the same, taken through the line $y\ y$, Fig. 2. Fig. 4, Sheet 2, represents a portion of the check-row rope. Fig. 5, Sheet 2, represents a modification of the same.

The object of this invention is to facilitate the planting of corn in check-rows and promote convenience in controlling the machine.

A is the axle, which is made of such a length that the distance between its wheels B will be equal to twice the required distance apart of the rows.

To the axle A, at the inner sides of the wheels B, are attached two bars, C, to the outer sides of the forward ends of which are pivoted the upper parts of the side hoppers, D. The side hoppers, D, are attached to and connected by a cross-bar, E.

To the end parts of the cross-bar E are attached the side runners, F, that open channels to receive the seed. The part of the runners F that enters the ground is made thin, and its lower rear corners are flared outward and inclined upward, as shown in Fig. 2, and in dotted lines in Fig. 1, so as to raise the soil and form a cavity into which the seed can escape from the conductor channels or spouts through which it passes from the hoppers D. As the runners pass on the soil falls back to its place, covering the seed, and is pressed down upon the seed by the rims of the wheels B.

To the center of the cross-bar E is attached the tongue G, which is strengthened in place by the inclined bars or braces H, the rear ends of which are attached to the rear end of the tongue G, or to a block, I, attached to the said tongue. The forward ends of the braces H are attached to the cross-bar E, about midway between its center and ends.

To the tongue G or to the block I are pivoted the forward ends of two parallel bars, J, which pass back beneath the axle A, and to their rear ends is attached the central hopper, K.

To the tongue G or to the block I are pivoted the lower ends of two standards, L, by the same bolt that pivots the forward ends of the bars J to the said tongue or block.

To the upper ends of the standards L is attached the driver's seat M.

To the axle A or to the seat-standards L is fulcrumed a foot-lever, N, the rear end of which is connected with the pivoted bars J in the rear of the axle A and close to the hopper K by a bar, link, or other suitable means.

To the rear ends of the bars J is attached a runner, O, similar in construction to the runners F, to open a channel to receive the seed from the hopper K. With this construction, when the driver presses the forward end of the lever N downward the rear ends of the bars J and the hopper K and runner O, attached to the said bars, will be raised from the ground, which movement will force the rear ends of the tongue G and braces H downward, and will raise the cross-bar E, the hoppers D, and the runners F from the ground, so that all the hoppers and runners will be raised from the ground by the same operation.

If desired, the forward part of the foot-lever N can be connected with the rear part of the tongue G by a bar or link, P, so that the downward movement of the forward part of the said foot-lever will force the said rear part of the tongue G downward, and thus cause the said lever to act more directly upon the said tongue.

The hoppers D D K and the runners F F O can be locked in a raised position for convenience in turning around and in passing from place to place by a rod or lever, Q, pivoted to the bars J and fulcrumed to the axle A. The forward part of the rod Q moves along and engages with a catch-bar, R, attached to one of the seat-standards L. The soil is pressed down upon the seed dropped from the central hopper K by the wheel S, which is journaled to a small frame, T. The forward end of the frame T is connected with the rear ends of the bars J or with the rear side of the hopper K by a connection, U, which may be a link and two clevises, a link and two staples, a link, a clevis or staple, and a bolt, or other flexible connection that will allow freedom of motion to the wheel-frame T. The hopper K is placed at a distance in the rear of a line joining the hoppers D, equal to the desired distance apart of the hills.

V is a three-armed plate or lever, which is pivoted at its center to the cross-bar E.

To one arm of the plate or lever V is pivoted the seed-dropping slide W of the hoppers D, and to the second arm of the said lever V is pivoted the seed-dropping slide X of the rear hopper K, so that seed will be dropped simultaneously from all the hoppers by the movement of the lever V.

To the third arm of the lever V is pivoted the rear end of the connecting-rod Y, the forward end of which is pivoted to the lower part of the lever Z. The lower end of the lever Z is hinged to the cross-bar $a$, and its upper end is forked to receive the check-rope $b$, and has a pulley, $c$, pivoted to it to lessen the friction of the said check-rope $b$. The lever Z is placed about midway between the center and end of the cross-bar $a$, and to the lower part of the said lever is pivoted the end of a connecting-rod, $d$, the other end of which is pivoted to the upper end of the lever $e$. The lever $e$ is hinged at or near its upper end to a support, $f$, attached to the cross-bar $a$. The lever $e$ is placed about midway between the center and end of the cross-bar $a$, and has its lower end forked to receive the check-rope $b$, and has a pulley, $g$, pivoted to it to lessen the friction of the said check-rope. The levers Z $e$ are thus at a distance apart about equal to the distance between the rows of hills. The cross-bar $a$ is attached at its center to the tongue G and at its end parts to the braces H and runners F. The cross-bar $a$ is made of such a length that its ends project beyond the side hoppers, D, and to the upper sides of its said ends are attached plates or cross-heads $h$, to each of which are pivoted four pulleys, $i$. The two inner pulleys, $i$, of each set are pivoted in such positions that the space between them will be in line with the levers Z $e$, and the two outer pulleys of each set are pivoted in such positions that the check-rope while passing from the inner to the outer pulley will be at an angle of forty-five degrees (45°) with its course while crossing the machine and while crossing the field. By this arrangement of the pulleys $i$ the check-rope $b$ will be kept from making a short turn when passing to and from the planter.

Upon the check-ropes $b$, at a distance apart equal to the required distance apart of the hills, are formed, or to it are attached, knobs or buttons $j$ to strike against and operate the levers Z $e$, and thus operate the seed-dropping mechanism. In the case of wire ropes, the buttons $j$ may be metal balls cast upon bends or coils formed in the said rope, as illustrated in Fig. 5. In the case of ropes made of hemp or other fibrous material, the buttons $j'$ may be formed of pieces of wire the ends of which are bent to pass around the said rope, the planes of the said bends being at right angles with each other, so that when one bend of the buttons $j'$ may be in the same plane with the fork of one of the levers Z $e$ the other bend of the said buttons will be at right angles with the said fork, and thus insure the said levers being operated by the passage of the said button.

To the seed-dropping slide X is pivoted the lower end of the lever $k$, which is fulcrumed to a support attached to the forward side of the rear hopper K. The upper end of the lever $k$ projects into such a position that it can be conveniently reached and operated by the driver from his seat M to adjust the seed-dropping mechanism or drop the seed by hand. The rear ends of the side bars, C, project, and to the outer sides of the said rear ends are pivoted the upper ends of the bars $l$. The bars $l$ pass down along the inner sides of the rear parts of the wheels B, and to their lower ends are attached plates $m$, which project across the lower rear parts of the faces of the said wheels B, so as, when the said bars $l$ are swung forward, to come in contact with the lower rear parts of the faces of the wheels B and scrape off any soil that may adhere to the said faces.

To the lower parts of the swinging bars $l$ are pivoted the rear ends of the connecting-rods $n$, the forward ends of which are pivoted to the rear ends of the bent levers $o$. The bent levers $o$ are pivoted at their angles to the lower side of the axle A, and to their other ends are pivoted the outer ends of the connecting-rods $p$, the inner ends of which are pivoted to the two short arms of the three-armed foot-lever $q$. The lever $q$ is pivoted to the axle A, and its third arm extends up into such a position that it can be readily reached and operated by the driver with his foot to apply the scrapers $m$ to the wheels B when required.

To the rear end of the frame T is pivoted a rod, $r$, the middle part of which is bent into crank form to adapt it to serve as a scraper, $s$, or to have a scraper, $s$, attached to it to scrape off any soil that may adhere to the face of the wheel S. The outer ends of the rod $r$ are bent into crank form or have cranks attached to them, to which are pivoted the ends of a bail, $t$.

To the center of the bail $t$, or to an eye formed upon or attached to the said center, is attached the end of a cord or chain, $u$, the other end of which is attached to the seat M or other support in such a position that it can be conveniently reached and operated by the driver from his seat; or the forward end of the cord or chain $u$ can be attached to a foot-lever pivoted to some suitable support in such a position that it can be conveniently operated by the driver with one foot to apply the scraper $s$, while with his other foot he operates the lever $q$ to apply the scrapers $m$.

Having thus fully described my invention,

I claim as new and desire to secure by Letters Patent—

1. The combination, with the tongue G, of the parallel pivoted bars J, passing under the axle A and carrying at their rear ends the central hopper K, as shown and described.

2. The lever N, combined with the bars J, hoppers D K, runners F O, tongue G, and braces H, whereby the hopper K and runner O will be lifted as the hoppers D and runners F are depressed, for the purpose set forth.

3. The combination, with the three-armed lever V, which operates the seed-slides, of the lever Z, the rod Y, pivoted to levers V Z, the forked and hinged cross-bar a, the check-rope b, having knobs j and carrying pivoted pulley c, the hinged and forked lever e, carrying pivoted pulley g, the rod d, pivoted to levers e Z, and the pulleys i on the cross-heads h of bar a, as and for the purpose set forth.

JOHN FELDMIER.

Witnesses:
J. H. BENNET,
J. N. INSLEY.